US008568276B2

(12) United States Patent
Tsuzuki et al.

(10) Patent No.: US 8,568,276 B2
(45) Date of Patent: Oct. 29, 2013

(54) CONTROL MECHANISM AND METHOD FOR ENGAGEMENT OF IMPELLER CLUTCH

(75) Inventors: Yukihisa Tsuzuki, Kariya (JP); Yosuke Makino, Anjo (JP); Tomoko Yamamoto, Chiryu (JP); Tomoyuki Kitagawa, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 309 days.

(21) Appl. No.: 12/944,131

(22) Filed: Nov. 11, 2010

(65) Prior Publication Data

US 2011/0118082 A1    May 19, 2011

(30) Foreign Application Priority Data

Nov. 17, 2009 (JP) ................................. 2009-261701

(51) Int. Cl.
*F16H 61/00* (2006.01)
*F16H 61/14* (2006.01)
*B60W 10/02* (2006.01)
*B60W 10/04* (2006.01)

(52) U.S. Cl.
USPC ........................... 477/168; 477/174; 477/180

(58) Field of Classification Search
USPC ........................... 477/168, 169, 174, 175, 180
See application file for complete search history.

(56) References Cited

U.S. PATENT DOCUMENTS

| 5,320,202 | A | * | 6/1994 | Wakahara | ...................... | 192/3.3 |
| 5,611,371 | A | * | 3/1997 | Wirtz | ...................... | 137/625.64 |
| 5,893,438 | A | * | 4/1999 | Hasegawa et al. | ............. | 192/3.3 |
| 8,167,103 | B2 | * | 5/2012 | Uhler et al. | ................... | 192/3.25 |
| 2004/0188208 | A1 | | 9/2004 | Leber | | |
| 2006/0185954 | A1 | | 8/2006 | Rebholz | | |
| 2008/0149442 | A1 | | 6/2008 | Sturgin | | |
| 2008/0202882 | A1 | * | 8/2008 | Sturgin et al. | ................ | 192/3.25 |
| 2009/0157272 | A1 | * | 6/2009 | Uhler et al. | ..................... | 701/67 |

FOREIGN PATENT DOCUMENTS

JP     60030864 A     2/1985
JP     2007-113659 A  5/2007

OTHER PUBLICATIONS

Japanese Patent Office Action dated Jun. 25, 2013 issued in the corresponding Japanese Patent Application No. 2009-261701 and English language translation.

* cited by examiner

*Primary Examiner* — Tisha Lewis
(74) *Attorney, Agent, or Firm* — Buchanan Ingersoll & Rooney PC

(57) ABSTRACT

A method for engagement of an impeller clutch includes a process for decreasing a back pressure relative to a clutch engagement pressure by decreasing an internal pressure of a torque converter in a case where the impeller clutch is brought into an engaged state, the impeller clutch enabling a driving force of an engine to be transmitted and disconnected to and from a pump impeller of the torque converter, transmission and disconnection of the driving force between the engine and the pump impeller being controlled by the clutch engagement pressure that is applied to the impeller clutch through an independent oil passage.

11 Claims, 3 Drawing Sheets

US 8,568,276 B2

CONTROL MECHANISM AND METHOD FOR ENGAGEMENT OF IMPELLER CLUTCH

CROSS REFERENCE TO RELATED APPLICATIONS

This application is based on and claims priority under 35 U.S.C. §119 to Japanese Patent Application 2009-261701, filed on Nov. 17, 2009, the entire content of which is incorporated herein by reference.

TECHNICAL FIELD

This disclosure relates to a control mechanism and a method for controlling a torque converter apparatus provided with an impeller clutch. In particular, the disclosure pertains to a control mechanism and a method for engagement of an impeller clutch included in the torque converter apparatus.

BACKGROUND DISCUSSION

A known hydrodynamic torque converter disclosed in US2006/0185954A1 (hereinafter referred to as Reference 1) includes an impeller clutch. A known lock-up device for a hydraulic torque converter including an impeller clutch is disclosed in JP2007-113659A (hereinafter referred to as Reference 2). According to References 1 and 2, a driving force of an engine may be transmitted and disconnected by the impeller clutch to and from a pump impeller of the torque converter through an independent oil passage. Transmission and disconnection of the driving force between the engine and the pump impeller is controlled by a clutch engagement pressure supplied to the impeller clutch through the independent oil passage. In a case where a vehicle is expected to start moving, the clutch engagement pressure is applied to the impeller clutch via the independent oil passage. Then, the impeller clutch is brought into an engaged state to therefore bring the vehicle into a state to start moving.

The aforementioned independent oil passage is provided at a different position from an oil passage via which a pressure is applied to the torque converter disclosed in References 1 and 2. Accordingly, the impeller clutch having the independent oil passage may be easily controlled. The pressure applied to the torque converter corresponds to an internal pressure of the torque converter.

However, in the impeller clutch according to References 1 and 2, the internal pressure of the torque converter acts as a back pressure relative to the impeller clutch and thereby causes the impeller clutch to require time to reach a completely engaged state after the clutch engagement pressure is applied to the impeller clutch. As a result, a time lag occurs between the time when the impeller clutch is brought into the completely engaged state and the time when the vehicle is brought into the state to start moving.

A need thus exists for a control mechanism and a method for engagement of an impeller clutch, which are not susceptible to the drawback mentioned above.

SUMMARY

According to an aspect of this disclosure, a method for engagement of an impeller clutch includes a process for decreasing a back pressure relative to a clutch engagement pressure by decreasing an internal pressure of a torque converter in a case where the impeller clutch is brought into an engaged state, the impeller clutch enabling a driving force of an engine to be transmitted and disconnected to and from a pump impeller of the torque converter, transmission and disconnection of the driving force between the engine and the pump impeller being controlled by the clutch engagement pressure that is applied to the impeller clutch through an independent oil passage.

According to another aspect of the disclosure, a control mechanism for engagement of an impeller clutch includes a structure for decreasing a back pressure relative to a clutch engagement pressure by decreasing an internal pressure of a torque converter in a case where the impeller clutch is brought into an engaged state, the impeller clutch enabling a driving force of an engine to be transmitted and disconnected to and from a pump impeller of the torque converter, transmission and disconnection of the driving force between the engine and the pump impeller being controlled by the clutch engagement pressure that is applied to the impeller clutch through an independent oil passage.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
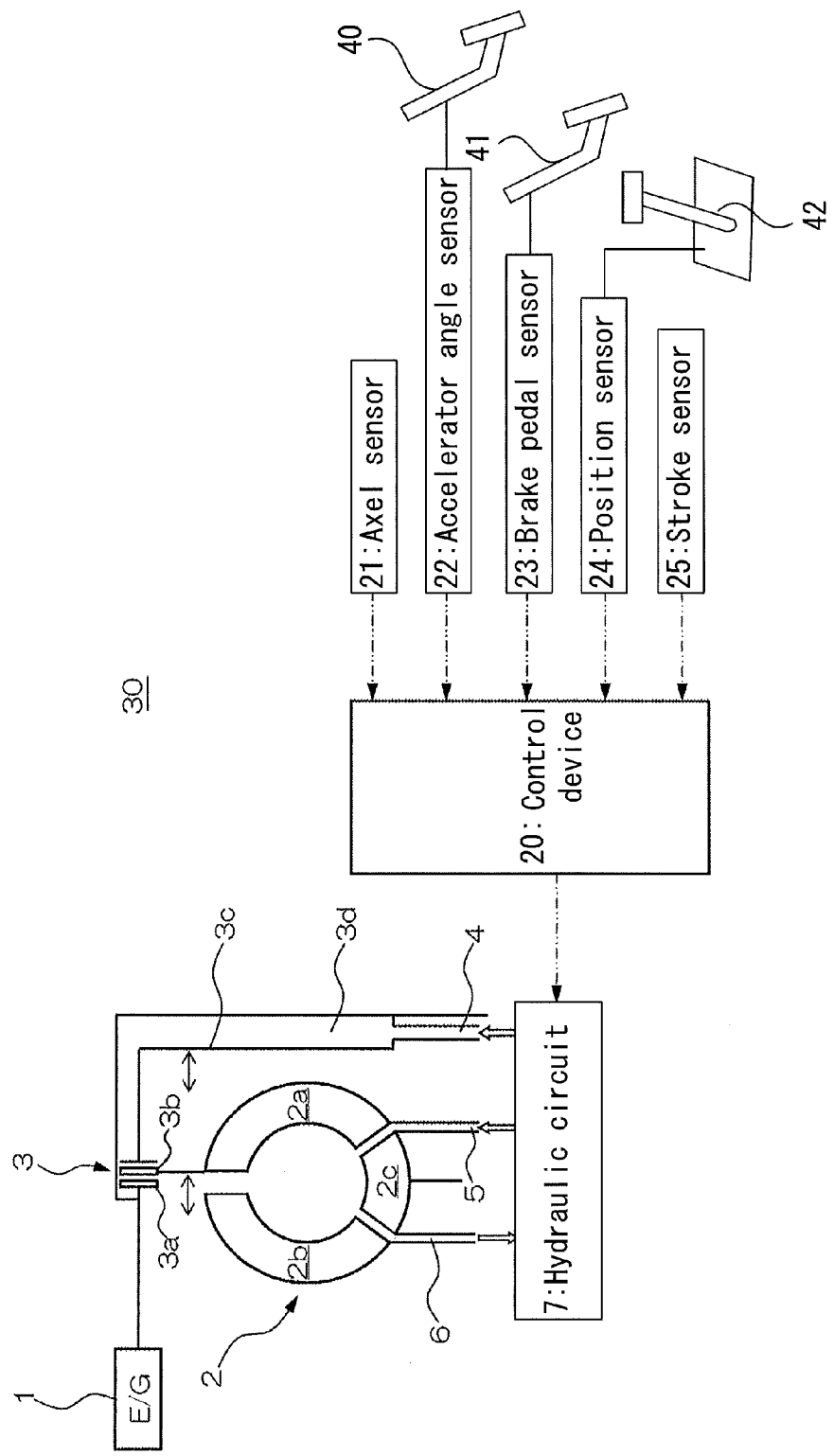
FIG. 1 is an explanation drawing for a torque converter apparatus in which a method for engagement of an impeller clutch provided in the torque converter apparatus, according to an embodiment is applied.

A torque converter apparatus 30 according to an embodiment of this disclosure will be described as follows with reference to illustrations of the attached drawings. FIG. 1 is an explanation drawing illustrating the torque converter apparatus 30 in which a method for engagement of an impeller clutch 3 is applied.

As illustrated in FIG. 1, the torque converter apparatus 30 includes a torque converter 2, the impeller clutch 3, an independent oil passage 4, a torque converter oil supply passage 5, a torque converter oil discharge passage 6 (oil discharge passage), a hydraulic circuit 7, and a control device 20. A clutch engagement pressure is applied to the impeller clutch 3 (to a hydraulic pressure chamber 3d of the impeller clutch 3) through the independent oil passage 4. The independent oil passage 4 is provided at a different position from other oil passages. In particular, the independent oil passage 4 is arranged separately from the torque converter oil supply passage 5 through which a lubrication oil is supplied to an inside of the torque converter 2. The lubrication oil is discharged from the inside of the torque converter 2 through the torque converter oil discharge passage 6. The hydraulic circuit 7 controls the supply of the clutch engagement pressure and an internal pressure (pressure) relative to the impeller clutch 3 and the torque converter 2, respectively. The internal pressure of the torque converter 2 will be referred to as a T/C internal pressure hereinafter (T/C corresponds to the torque converter 2). The control device 20 controls the torque converter apparatus 30 via the hydraulic circuit 7 in accordance with signals detected by various sensors 21 to 25.

The torque converter 2 includes a pump impeller 2a serving as an input element, a turbine liner 2b serving as an output element, and a stator wheel 2c. The stator wheel 2c multiplies torque of an engine 1, which is transmitted via a fluid, between the pump impeller 2a and the turbine liner 2b.

The impeller clutch 3 includes first frictional engagement members 3a, second frictional engagement members 3b, a clutch piston 3c, and the hydraulic pressure chamber 3d. The first frictional engagement members 3a integrally rotate with an output member of the engine 1. The second frictional engagement members 3b integrally rotate with the pump impeller 2a while being engageable with the first frictional engagement members 3a. The clutch piston 3c is moved by the engagement clutch pressure applied via the independent oil passage 4 to thereby press the first frictional engagement members 3a to the second frictional engagement members 3b. The clutch engagement pressure is supplied by the hydraulic circuit 7 to the hydraulic pressure chamber 3d through the independent oil passage 4 while being discharged by the hydraulic circuit 7 from the hydraulic pressure chamber 3d through the independent oil passage 4.

A control mechanism for the engagement of the impeller clutch 3 is configured by the independent oil passage 4, the torque converter oil supply passage 5, the torque converter oil discharge passage 6, the hydraulic circuit 7, and the control device 20 of the torque converter apparatus 30. A structure for decreasing a back pressure against the clutch engagement pressure (relative to the impeller clutch 3) is configured by the torque converter oil discharge passage 6, the hydraulic circuit 7, and the control device 20 of the torque converter apparatus 30.

A signal detected by an axle sensor 21 and indicating a vehicle speed, a signal detected by an accelerator angle sensor 22 and indicating an opening angle of an accelerator pedal 40 pressed by a driver, a signal detected by a brake pedal sensor 23 and indicating a degree by which a brake pedal 41 is pressed by the driver, a signal detected by a position sensor 24 and indicating selected and shifted positions of a shift lever 42, and a signal detected by a stroke sensor 25 and indicating a stroke volume of the clutch piston 3c of the impeller clutch 3 are inputted to the control device 20 of the torque converter apparatus 30. The control device 20 is configured so that the hydraulic circuit 7 supplies the T/C internal pressure and the clutch engagement pressure relative to the torque converter 2 and the impeller clutch 3, respectively.

Figure 2:
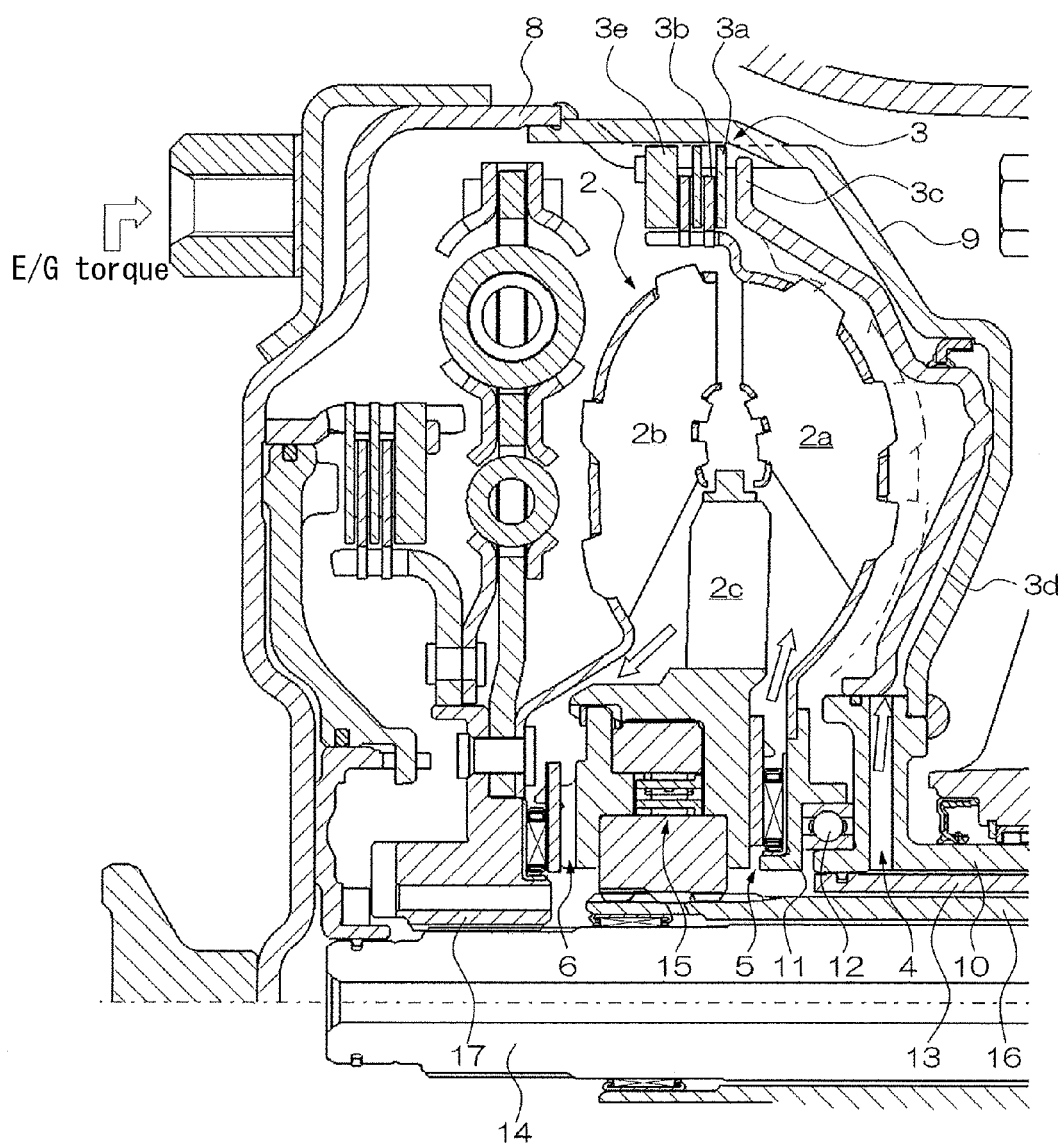
FIG. 2 is a detailed view of a configuration of the torque converter apparatus shown in FIG. 1.

FIG. 2 is a view of a detailed configuration of the torque converter apparatus 30 illustrated in FIG. 1. As illustrated in FIG. 2, a front cover 8 to which the torque of the engine 1 is inputted is integrally formed with a rear cover 9. The rear cover 9 is integrally formed with a rear cover hub 10. The pump impeller 2a is integrally formed with an impeller hub 11. The impeller hub 11 is rotatably supported by the rear cover hub 10 via a bearing 12.

An inner circumferential portion of the clutch piston 3c is slidably supported by the rear cover hub 10. An outer circumferential portion of the clutch piston 3c is spline-fitted to an inner circumferential surface of a large-diameter portion of the rear cover 9 so as to move in an axial direction of an output shaft 14 of the torque converter 2. The first frictional engagement members 3a are spline-fitted to an inner circumferential surface of a large-diameter portion of the rear cover 9. The second frictional engagement members 3b are spline-fitted to an end of a large-diameter portion of the pump impeller 2a. In a case where the impeller clutch 3 is brought into an engaged state, the first frictional engagement members 3a are engaged with the second frictional engagement members 3b while being supported between the clutch piston 3c and a flange 3e that is locked at the rear cover 9.

A sleeve 13 is arranged at an inner circumferential side of the rear cover hub 10. A stator wheel shaft 16 is positioned between an inner circumferential side of the sleeve 13 and an outer circumferential side of the output shaft 14 of the torque converter 2. The stator wheel shaft 16 supports the stator wheel 2c via a one-way clutch 15.

The independent oil passage 4 is formed in the rear cover hub 10 so as to extend radially. The lubrication oil and the clutch engagement pressure relative to the impeller clutch 3 are supplied by the hydraulic circuit 7 shown in FIG. 1, to the independent oil passage 4 through a clearance defined between the inner circumferential side of the rear cover hub 10 and an outer circumferential side of the sleeve 13. The torque converter oil supply passage 5 is formed between the stator wheel 2c and the impeller hub 11. The T/C internal pressure is supplied by the hydraulic circuit 7 to the torque converter oil supply passage 5 through a space defined between the inner circumferential side of the sleeve 13 and an outer circumferential side of the stator wheel shaft 16. The torque converter oil discharge passage 6 is formed between the turbine liner 2b and a turbine hub 17 integrally formed with the turbine liner 2b. The T/C internal pressure is discharged from the torque converter oil discharge passage 6 toward the hydraulic circuit 7 through a clearance defined between an inner circumferential side of the stator wheel shaft 16 and the outer circumferential side of the output shaft 14.

Figure 3:
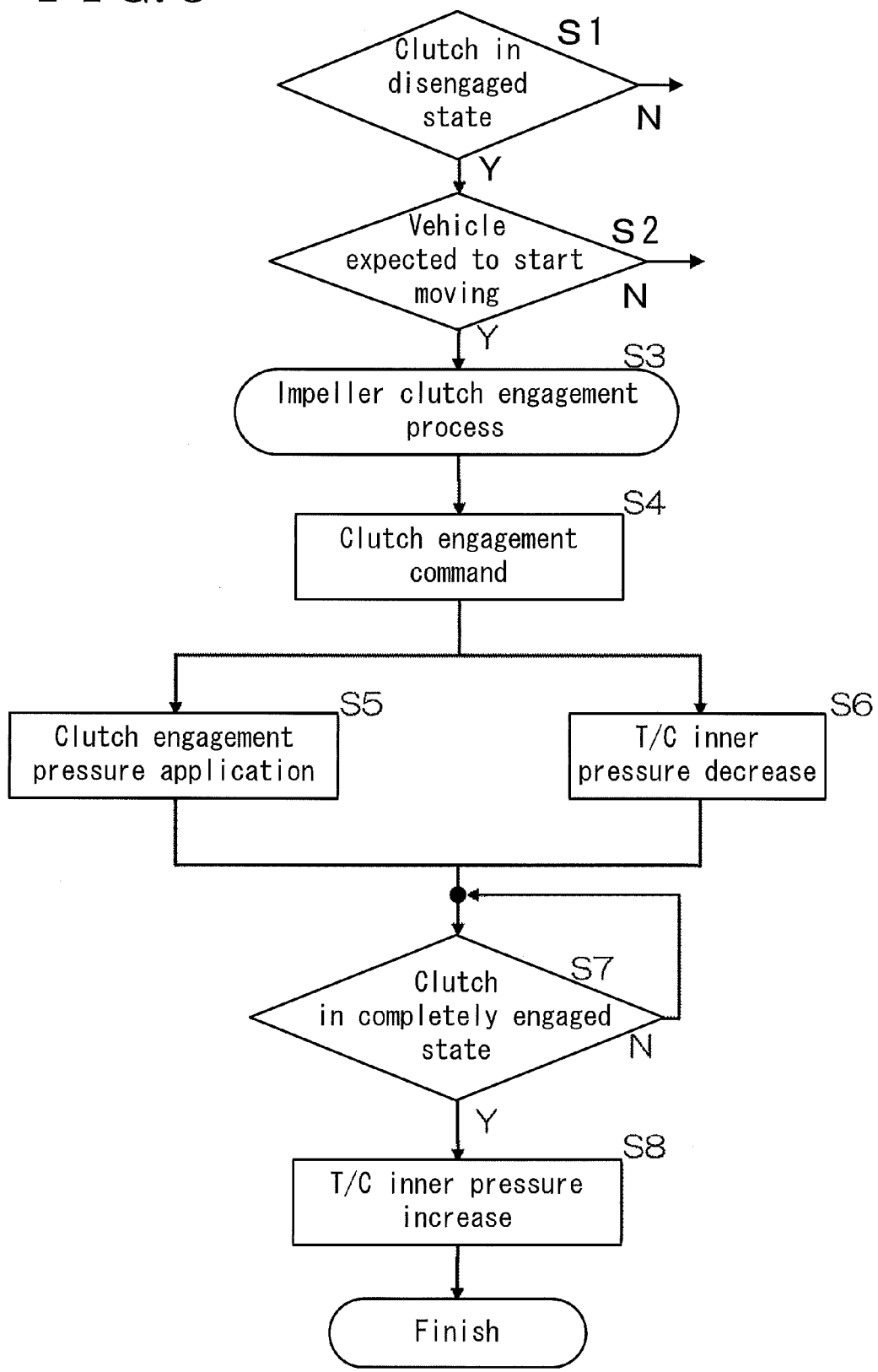
FIG. 3 is a flow chart describing the method for the engagement of the impeller clutch of the torque converter apparatus according to the embodiment.

In the torque converter apparatus 30 as described above, the method for the engagement of the impeller clutch 3 according to the embodiment will be explained as follows. FIG. 3 is a flow chart describing the method for the engagement of the impeller clutch 3 of the torque converter apparatus 30.

As illustrated in FIG. 3, the control device 20 determines in Step 1 (S1), for example, on the basis of the signal detected by the stroke sensor 25 whether or not the impeller clutch 3 is in a disengaged state. Then, in a case where the control device 20 determines that the impeller clutch 3 is in the disengaged state, the control device 20 shifts a process of S1 to a process of Step 2 (S2). Meanwhile, in a case where the control device 20 determines that the impeller clutch 3 is in the engaged state, the control device 20 shifts the process of S1 to a different process.

In S2, the control device 20 determines on the basis of the signals detected by the accelerator angle sensor 22, the brake pedal sensor 23, and the position sensor 24 whether or not the vehicle is expected to start moving. In a case where the control device 20 determines that the vehicle is expected to start moving, the control device 20 shifts the process of S2 to impeller clutch engagement processes following a process of Step 3 (S3). Meanwhile, in a case where the control device 20 determines that the vehicle is not expected to start moving, the control device 20 shifts the process of S2 to a different process. The time when the vehicle is expected to start moving corresponds, for example, to (a) the time when the brake pedal 41 of the vehicle on which the impeller clutch 3 is mounted is released under the disengaged state of the impeller clutch 3, (b) the time when the accelerator pedal 40 of the vehicle is pressed by the driver under the disengaged state of the impeller clutch 3, or (c) when the shift lever 42 is selectively shifted to a drive mode (D range) by the driver under the disengaged state of the impeller clutch 3. Further alternatively, while the vehicle is in a moving state, the impeller clutch engagement processes following the process of S3 may be performed as described above.

In Step 4 (S4) after S3, the control device 20 commands the hydraulic circuit 7 to bring the impeller clutch 3 into the engaged state. Then, the hydraulic circuit 7 simultaneously performs a process of clutch engagement pressure application in Step 5 (S5) and a process of T/C internal pressure decrease in of Step 6 (S6). In particular, as shown in FIG. 1 and FIG. 2, the hydraulic circuit 7 controlled by the control device 20 supplies the clutch engagement pressure to the hydraulic pressure chamber 3d through the independent oil passage 4 at the same time as decreasing the T/C internal pressure, serving as the back pressure relative to the impeller clutch 3 (clutch piston 3c), through the torque converter oil discharge passage 6. Accordingly, the clutch engagement pressure supplied to the hydraulic chamber 3d promptly increases to be higher than the T/C internal pressure after the control device 20 commands the hydraulic circuit 7 to bring the impeller clutch 3 into the engaged state. As a result, the time required to bring the impeller clutch 3 into a completely engaged state is decreased.

In Step 7 (S7), the control device 20 determines on the basis of the signal from the stroke sensor 25 whether or not the impeller clutch 3 is brought into the completely engaged state. In a case where the impeller clutch 3 is brought into the completely engaged state, a process of S7 shifts to a process of Step 8 (S8). In a case where the impeller clutch 3 is not brought into the completely engaged state, the process of S5 and the process of S6 are continued.

In order to surely lubricate and cool the torque converter 2, in Step 8 (S8) after the control device 20 confirms that the impeller clutch 3 is brought into the completely engaged state, the control device 20 controls the hydraulic circuit 7 to supply the lubrication oil to the torque converter 2 through the torque converter oil supply passage 5 to thereby increase the T/C internal pressure. In addition, in the case of releasing the impeller clutch 3 from the engaged state, the control device 20 firstly controls the hydraulic circuit 7 to discharge the clutch engagement pressure from the hydraulic pressure chamber 3d through the independent oil passage 4.

As shown in a flow chart of FIG. 3, the control device 20 simultaneously performs the process of clutch engagement pressure application in S5 and the process of T/C internal pressure decrease in S6. Alternatively, the process of S5 and the process of S6 may be started at a different timing. For example, when the torque converter 2 requires to be further lubricated or to be further cooled, the process of T/C internal pressure decrease in S6 may be performed after the process of clutch engagement pressure increase in S5. Meanwhile, when the torque converter 2 does not require to be further lubricated or to be further cooled, the process of clutch engagement pressure increase in S5 may be performed after the process of T/C internal pressure decrease in S6.

In addition, in Step 7 (S7) in the flow chart shown in FIG. 3, the control device 20 may determine whether the impeller clutch 3 is in the engaged state or in the disengaged state in the following ways. (a) The control device 20 determines whether or not the impeller clutch 3 is in the engaged state, on the basis of a difference between rotations of the engine 1 and rotations of the output shaft 14 of the torque converter 2 or an input shaft of a transmission. The rotations of the engine 1 are detected by an engine rotation sensor. In a case where the difference reaches zero or is equal to or lower than a predetermined value, the control device 20 determines that the impeller clutch 3 is in the completely engaged state. (b) The control device 20 determines whether or not the impeller clutch 3 is in the engaged state, on the basis of a signal detected by a hydraulic pressure sensor that detects hydraulic pressure applied to the impeller clutch 3 by the hydraulic circuit 7 or on the basis of a control signal relative to the hydraulic circuit 7.

The control mechanism and the method for the engagement of the impeller clutch 3 according to the embodiment may be utilized for a torque converter including an impeller clutch to which an independent oil passage is applied, a transmission including the impeller clutch, and controlling a vehicle on which the transmission is mounted.

As described above, in the torque converter apparatus 30 provided with the impeller clutch 3 including the independent oil passage 4, when the impeller clutch 3 is brought into the engaged state, the T/C internal pressure acting as the back pressure relative to the impeller clutch 3 is decreased; thereby, the clutch engagement pressure promptly increases to be higher than the back pressure. Accordingly, the time required to bring the impeller clutch 3 into the engaged state is reduced. Thus, in particular, the time until the impeller clutch 3 reaches the completely engaged state after the control device 20 determines that the vehicle is expected to start moving is reduced. In addition, a time lag between the time when the impeller clutch 3 reaches the engaged state and the time when the vehicle reaches the state to start moving is reduced.

According to the aforementioned embodiment, the process of S6 for decreasing the back pressure relative to the clutch engagement pressure by decreasing the T/C internal in a case where the impeller clutch 3 is brought into the engaged state, is performed when the brake pedal 41 of the vehicle on which the impeller clutch 3 is mounted is released, when the accelerator pedal 40 of the vehicle is pressed, or when the shift lever 42 is selected to the drive mode.

As described above, in a case (a) where the brake pedal 41 of the vehicle on which the impeller clutch 3 is mounted is released by the driver under the disengaged state of the impeller clutch 3, (b) where the accelerator pedal 40 of the vehicle is pressed by the driver under the disengaged state of the impeller clutch 3, or (c) where the shift lever 42 is shifted to the drive mode (D range) by the driver under the disengaged state of the impeller clutch 3, the T/C internal pressure is decreased; thereby, the process of T/C internal pressure decrease in S6 is performed. Thus, when the vehicle is in the state to start moving, the time required to bring the impeller clutch 3 into the engaged state is reduced. In addition, the time lag between the time when the impeller clutch 3 reaches the engaged state and the time when the vehicle reaches the state to start moving is further reduced.

According to the aforementioned embodiment, the application of the clutch engagement pressure relative to the impeller clutch 3 and the decrease of the T/C internal pressure are simultaneously started in the process of S6.

As a result, the time required to bring the impeller clutch 3 into the engaged state is further reduced.

According to the aforementioned embodiment, the application of the clutch engagement pressure relative to the impeller clutch 3 and the decrease of the T/C internal pressure are started at the different timing.

As a result, the timing when the clutch engagement pressure is increased and the timing when the T/C internal pressure is reduced are controlled depending on operating conditions of the vehicle, for example, on whether or not the vehicle is expected to start moving.

In addition, according to the embodiment, the impeller clutch 3 may be brought into the engaged state not only when the vehicle is in the state to start moving (in a stopped state) but also when the vehicle is in the moving state. For example, when the supply of fuel to the engine 1 is stopped during deceleration of the vehicle, rotations of the engine 1 decrease. Then, an injection volume of the fuel to the engine 1 may be controlled to increase. At this time, a large load is applied to the engine 1; therefore, a large volume of the fuel is injected to the engine 1 to decrease fuel efficiency of the engine 1. Accordingly, the impeller clutch 3 is required to be released from the engaged state to reduce the load applied to the engine 1 in order to prevent the decrease of the fuel efficiency of the engine 1. In a case where the impeller clutch 3 brought into the disengaged state as described above is brought back into the engaged state, the engagement of the impeller clutch 3 according to the embodiment may be appropriately established.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for engagement of an impeller clutch, comprising:
   performing a process for decreasing a back pressure relative to a clutch engagement pressure by decreasing an internal pressure of a torque converter in a case where the impeller clutch is brought into an engaged state,
   wherein the impeller clutch enables a driving force of an engine to be transmitted and disconnected to and from a pump impeller of the torque converter,
   wherein transmission and disconnection of the driving force between the engine and the pump impeller is controlled by the clutch engagement pressure that is applied to the impeller clutch through an independent oil passage, and
   wherein the process is performed when a brake pedal of a vehicle on which the impeller clutch is mounted is released, when an accelerator pedal of the vehicle is pressed, or when a shift lever is selected to a drive mode.

2. The method for the engagement of the impeller clutch according to claim 1, wherein an application of the clutch engagement pressure relative to the impeller clutch and a decrease of the internal pressure of the torque converter are simultaneously started in the process.

3. The method for the engagement of the impeller clutch according to claim 1, wherein an application of the clutch engagement pressure relative to the impeller clutch and a decrease of the internal pressure of the torque converter are simultaneously started in the process.

4. The method for the engagement of the impeller clutch according to claim 1, wherein the application of the clutch engagement pressure relative to the impeller clutch and the decrease of the internal pressure of the torque converter are started at a different timing.

5. The method for the engagement of the impeller clutch according to claim 1, wherein the application of the clutch engagement pressure relative to the impeller clutch and the decrease of the internal pressure of the torque converter are started at a different timing.

6. A control mechanism for engagement of an impeller clutch, comprising:
   a structure for decreasing a back pressure relative to a clutch engagement pressure by decreasing an internal pressure of a torque converter in a case where the impeller clutch is brought into an engaged state,
   wherein the impeller clutch enables a driving force of an engine to be transmitted and disconnected to and from a pump impeller of the torque converter,
   wherein transmission and disconnection of the driving force between the engine and the pump impeller is controlled by the clutch engagement pressure that is applied to the impeller clutch through an independent oil passage, and
   wherein the structure functions to decrease the internal pressure of the torque converter when a brake pedal of a vehicle on which the impeller clutch is mounted is released, when an accelerator pedal of the vehicle is pressed, or when a shift lever is selected to a drive mode.

7. The control mechanism for the engagement of the impeller clutch according to claim 6, wherein an application of the clutch engagement pressure relative to the impeller clutch and a decrease of the internal pressure of the torque converter are simultaneously started.

8. The control mechanism for the engagement of the impeller clutch according to claim 6, wherein an application of the clutch engagement pressure relative to the impeller clutch and a decrease of the internal pressure of the torque converter are simultaneously started.

9. The control mechanism for the engagement of the impeller clutch according to claim 6, wherein the application of the clutch engagement pressure relative to the impeller clutch and the decrease of the internal pressure of the torque converter are started at a different timing.

10. The control mechanism for the engagement of the impeller clutch according to claim 6, wherein the application of the clutch engagement pressure relative to the impeller clutch and the decrease of the internal pressure of the torque converter are started at a different timing.

11. The control mechanism for the engagement of the impeller clutch according to claim 6, wherein the structure includes an oil discharge passage discharging a lubrication oil from the torque converter, a hydraulic circuit supplying the clutch engagement pressure and the internal pressure to the impeller clutch and the torque converter, respectively, and a control device controlling the torque converter and the impeller clutch via the hydraulic circuit.

* * * * *